United States Patent [19]

Dougherty et al.

[11] 4,107,402
[45] Aug. 15, 1978

[54] BATTERY AND BATTERY CONTAINER HAVING AIR-FLOW PASSAGES THERETHROUGH

[75] Inventors: Thomas John Dougherty, Waukesha; Roy Erving Hennen, Mequon; John Ronald Pierson, Brookfield, all of Wis.

[73] Assignee: Globe-Union Inc., Milwaukee, Wis.

[21] Appl. No.: 835,728

[22] Filed: Sep. 22, 1977

[51] Int. Cl.² ............................................. H01M 2/02
[52] U.S. Cl. .................................... 429/120; 429/148; 429/176
[58] Field of Search ................. 429/120, 71, 148, 163, 429/176

[56] References Cited

U.S. PATENT DOCUMENTS

| 2,980,751 | 4/1961 | Toce et al. | 429/120 |
| 3,364,076 | 1/1968 | Buttke et al. | 429/160 |

Primary Examiner—Donald L. Walton
Attorney, Agent, or Firm—David B. Smith; John Phillip Ryan

[57] ABSTRACT

A battery and battery container having air-flow passages therethrough. The container includes partitions separating the cells of the battery, the partitions each being comprised of a pair of spaced apart parallel partition walls defining a narrow generally planar air flow passage between the cells of the battery. The spaced apart partition walls are integrally joined together at a location adjacent a central portion which includes an aperture to permit intercell welding of adjacent cells.

8 Claims, 4 Drawing Figures

BATTERY AND BATTERY CONTAINER HAVING AIR-FLOW PASSAGES THERETHROUGH

BACKGROUND OF THE INVENTION

1. Field of the Invention

The present invention relates to batteries and containers for batteries. More particularly, the invention relates to a battery and a container therefore having an integral molded construction and including air-flow passages through the container to facilitate heat transfer from the battery.

2. Description of the Prior Art

Energy efficient hybrid vehicles have been developed employing relatively small internal combustion engines as the vehicle prime mover and including an electric motor-generator functional during peak power demands, such as during acceleration, to provide additional acceleration power and functional during periods of deceleration or braking to convert power to electrical energy. Batteries are provided to store the electrical energy generated by the electric motor-generator during deceleration and braking and also to deliver electric power to the electric motor during acceleration.

In the operation of hybrid vehicles, the batteries are subjected to a relatively rapid discharging cycle and in normal use the batteries are subjected to only a minor or shallow discharge before being recharged. During this rapid discharging and recharging of the batteries, heat is generated by current flow through the batteries. If the battery after discharge is subsequently charged and discharged again before the heat generated has been dissipated, a heat buildup will occur and cause thermal degradation of the materials used in construction of the battery. Heat buildup also tends to cause excessive loss of electrolyte and disproportionate charging of the cells of the battery resulting in failure of the battery, The heat generation in a conventional battery used in a hybrid vehicle can be substantial because the battery is subjected to a rapid charge/discharge cycle. Furthermore, heat generation is particularly acute when the battery being charged is nearly fully charged, and the operation of hybrid vehicles normally causes only shallow discharge before recharge. Due to the generation of such heat, prior art lead-acid batteries have not been sufficiently durable for use in hybrid vehicles.

Various other applications for batteries in industrial uses or the like have required batteries which include air-flow passages through the batteries to facilitate cooling of the batteries, but none of these batteries is acceptable for use in a hybrid vehicle. Such prior art batteries are shown in U.S. Pat. No. 3,745,048, issued July 10, 1973 to Dinkler et al; U.S. Pat. No. 2,273,244, issued Feb. 17, 1942 to Ambruster; U.S. Pat. No. 2,410,952, issued Nov. 12, 1946 to Leighton; and U.S. Pat. No. 3,767,468, issued Oct. 23, 1973 to Schusler. None of these batteries shown by the prior art, however, present a functional battery which can be used in a hybrid vehicle.

The batteries of the type shown in the Dinkler et al and Schusler patents, for example, are intended to function as stationary or industrial batteries and have a rigid metal container supporting a plurality of independent cells therein. A battery having such a metal case is generally heavy and unsuitable for a vehicle intended to be energy conservative. Furthermore, these batteries do not provide a configuration which is sufficiently compact to be desireable for use in a vehicle.

Other prior art batteries, as shown in U.S. Pat. No. 3,338,452 issued Aug. 29, 1967 to Oakley et al and U.S. Pat. No. 3,147,151 issued Sept. 1, 1964 to Toce, also have a construction permitting air flow between cells of the batteries. However, such batteries would also be unsuitable for use in hybrid vehicles. The batteries shown in the Oakley et al and Toce patents include a plurality of independent cells joined together by dovetailed connections to provide assemblies of varied numbers of cells, the number of cells being connected together being dependent on the desired size of the battery. Such batteries would not be desirable for use in a hybrid vehicle because assembly of the cells during manufacturing would be unduly expensive, the batteries would not be sufficiently compact; and the internal electrical resistance of the batteries would be too high to provide the required efficiency. This last detriment of such prior art batteries arises because relatively long connecting links are required to join the electrical terminals of the battery cells, the long connecting links resulting in increased internal electrical resistance in the battery. Furthermore, due to the rapid or frequent charge/discharge cycle of batteries in a hybrid vehicle, low internal resistance is required to decrease heat generation in the battery.

SUMMARY OF THE INVENTION

The present invention provides a battery and a battery container wherein the battery container is a one-piece molded unit having internally connected cell portions and including air-flow passages between the cells. The battery container, though providing for air flow between the cells to facilitate cooling and uniform temperature in each of the cells, also has a construction facilitating use of very short electrical connecting members between the cells thereby minimizing electrical resistance between the cells, increasing the efficiency of the battery and decreasing the heat generated by current flow through the connections. The one-piece molded container, though including air passages for air flow through the battery, also provides a size efficient, rigid durable unit having sufficient strength for use in a vehicle and capable of withstanding abusive handling.

Though the battery and battery container of the invention provide for air flow through the battery thereby making the battery useful in a hybrid vehicle, the battery and battery container can be used advantageously in other applications and are not limited to use in a hybrid vehicle.

DESCRIPTION OF THE PREFERRED EMBODIMENT

Figure 1:
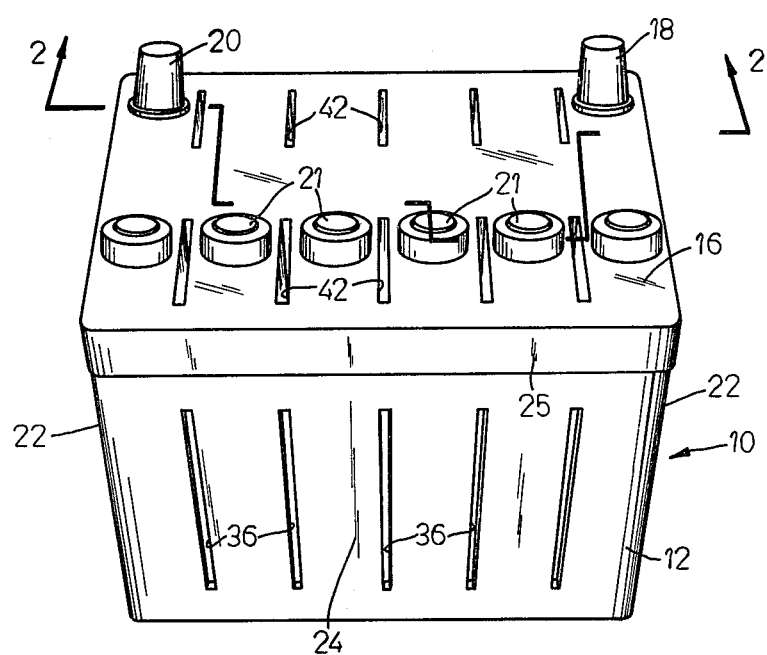
FIG. 1 is a perspective view of the battery and battery container of the invention.
Figure 2:
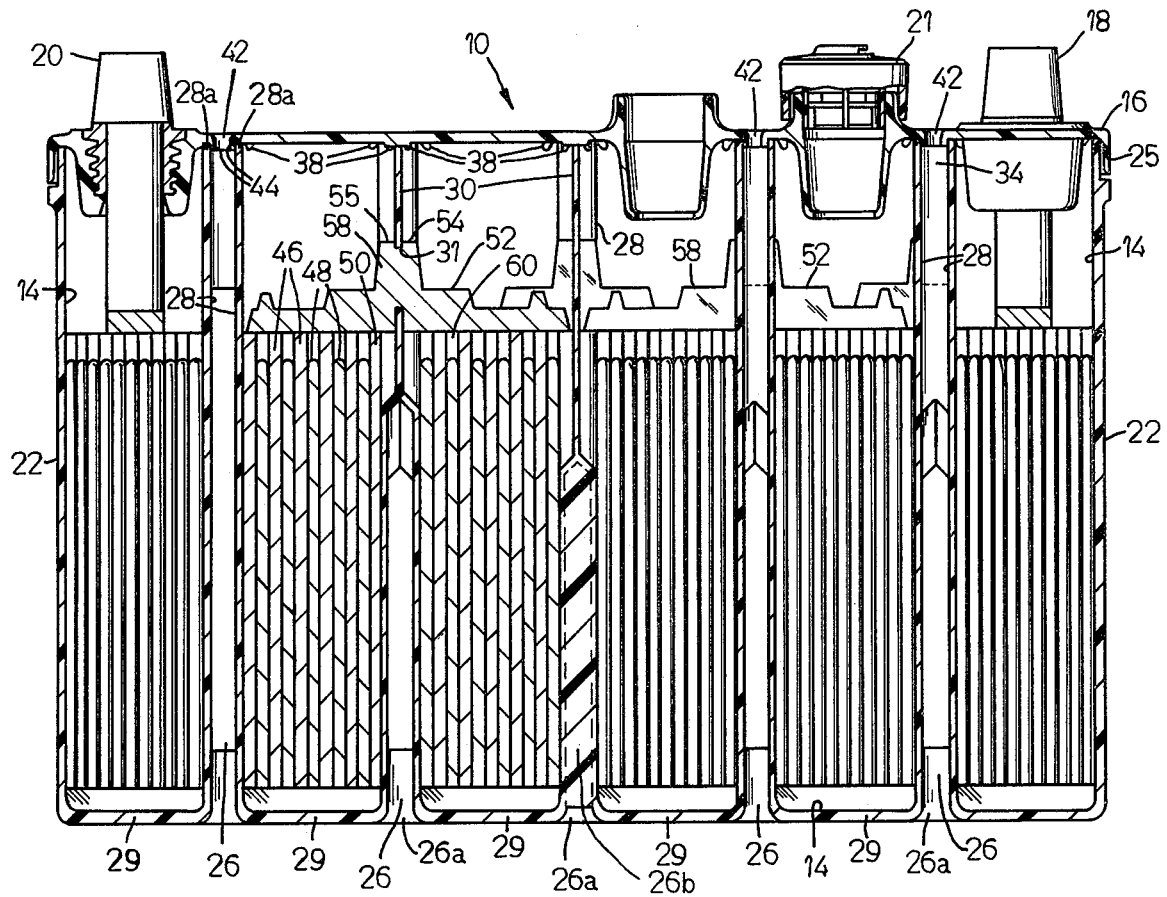
FIG. 2 is a side elevation cross-section view taken generally along line 2—2 in FIG. 1.

Referring to FIGS. 1 and 2 of the drawings, there is shown a battery 10 generally comprised of a one-piece integral container 12 divided into a plurality of cell compartments 14 and a top cover 16 received over the open end of the container 12 to seal the cell compartments 14. The battery top cover 16 supports positive and negative terminals 18 and 20, respectively, and a plurality of individual vent caps 21 functional to permit access to the cell compartments 14.

Battery Container

The container 12 is comprised of vertical end walls 22 and vertical side walls 24 joining the vertical end walls 22, and also includes a plurality of vertically extending narrow planar air passages 26 between each of the cell compartments and defined by pairs of generally parallel spaced apart partition walls 28. The container 12 also includes a plurality of integral cell compartment bottom walls 29. Rigidity of the battery container is provided by the side walls 24 which integrally join the sides of the cell compartments and is further provided by the top cover 16 which is heat sealed to the upper edges of container 12 and which includes a peripheral lip 25 surrounding the upper portion of the battery 12.

The pairs of partition walls 28, separating the cell compartments 14 and defining the narrow air flow passages 26 between the compartments, extend perpendicularly to the side walls 24. The upper edges 28a of partition walls 28 are held in place by the top cover 16 and the lower edges of the walls 28 are respectively integrally joined with the cell compartment bottom walls 29. The pairs of partition walls 28 respectively merge together at a location centrally and adjacent their upper portions to form a single thickness partition wall portion 30 having a material thickness approximating the thickness of one of the partition walls 28. The partition wall portion 30 joining the partition walls 28 includes an aperture 31 therethrough, the aperture 31 being intended to facilitate a connection between the battery cells in a manner to be describe hereinafter. It will be noted that the narrow planar air-flow passage 26 has an area nearly as great as the cross-section of the battery in the direction of the plane of the end walls 22 and that only the portion of the cell compartments 14 separated by the single thickness partition wall portion 30 are in adjacent relationship. At other locations the cell compartments 14 are separated by the air passage 26.

It will be noted that the narrow planar air conducting passage 26 between each of the battery cells and defined by the pairs of partition walls 28, each include an elongated narrow opening 26a adjacent the bottom walls 29 of the battery container and extending across the battery container between the side walls 24. The air conducting passages 26 also include a pair of linearly spaced apart slots 34 (FIG. 3) adjacent the upper end of the container 12, the slots 34 being linearly separated by the partition wall portion 30. Air flow upwardly through the battery and between the cell compartments 14 will be through the elongated openings 26a at the bottom of the battery 10 and then through the linearly spaced apart slots 34 adjacent the upper portion of the container.

As shown in FIG. 1, the side walls 24 include vertically extending elongated slots 36 therethrough, the slots 36 being mutually parallel and communicating with the airflow passages 26 to provide for additional air flow through the battery 10. The inclusion of the slots 36 is optional depending on the amount of air flow through the battery required.

Top Cover

The battery cover 16 is received against the upper edges of the container 12 and is heat sealed or otherwise bonded to the surfaces of the upper edges of the container 12. To facilitate such bonding of the cover 16 to the container 12, the lower side of the cover 16 to be received against the container is provided with a plurality of downwardly projecting vanes 38, the vanes 38 intended to be received on opposite sides of the upper edges of the partition walls 28 and single thickness partition wall portions 30 to properly align the cover 16 and the walls 28 and wall portions 30.

The vent caps 21 are of a type described in detail in U.S. Pat. No. 3,879,227 issued Apr. 22, 1975 to Hennen and assigned to the same assignee as the present invention.

The cover 16 is further provided with a plurality of parallel spaced apart pairs of linearly aligned, mutually spaced apart slots 42. When the cover is received against the top of the battery container, the slots 42 are aligned with the complementary linearly spaced apart slots 34 in the container 12 whereby air flow is facilitated vertically between the cells 14 and through the cover 16. Flanges 44 projecting downwardly from the lower surface of the top cover 16 and surrounding the slots 42 in the top cover 16 are respectively received within the upper end of the air flow passages 34 of the container 12 when the top cover 16 is heat sealed onto the container 12.

In order to provide for increased air flow between the battery cells, the elongated slots 36 can be extended upwardly and slots 42 extended to merge with slots 36.

Intercell Connection

Figure 3:
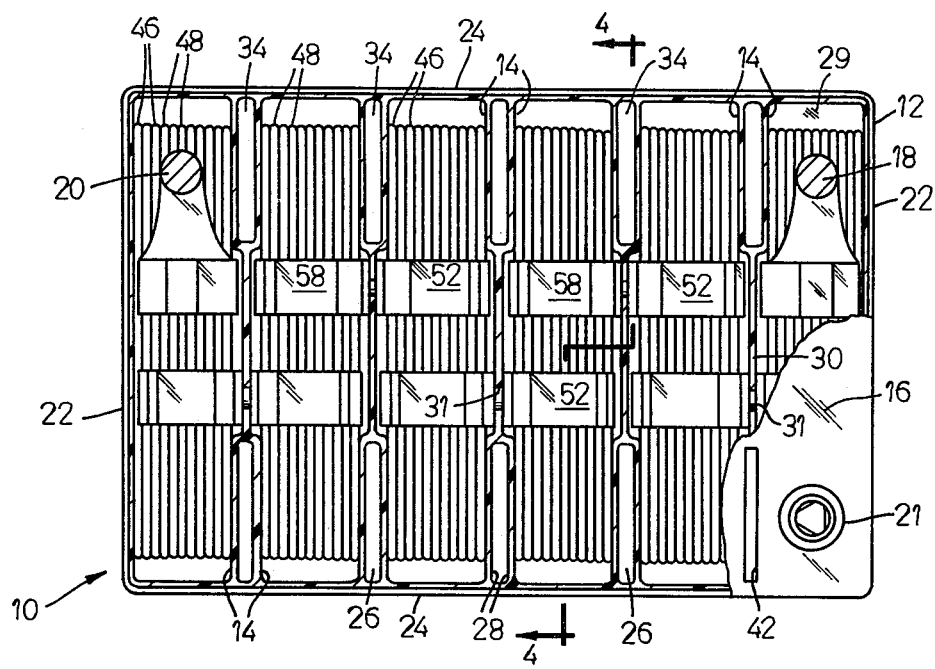
FIG. 3 is a plan view of the battery shown in FIG. 1 with a portion of the top cover broken away.
Figure 4:
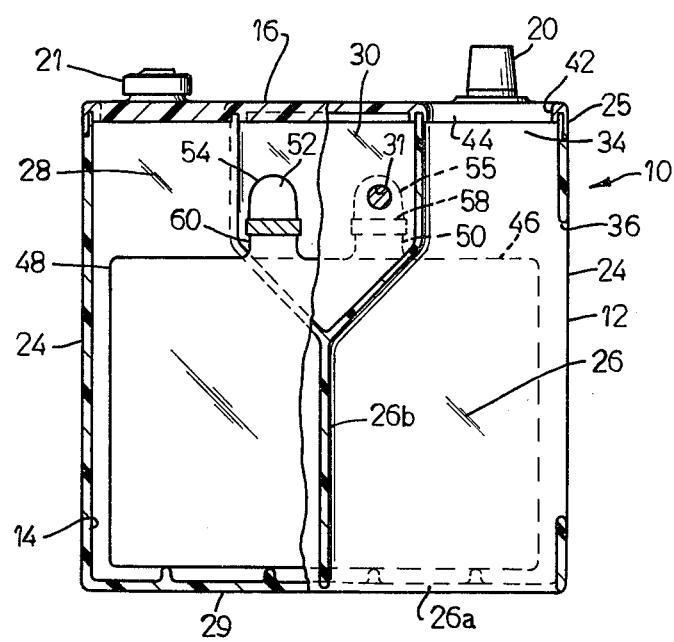
FIG. 4 is an end elevation cross-section view of the battery and taken generally along line 4—4 in FIG. 3.

As shown in FIGS. 2-4, the cell compartments 14 each include a plurality of stacked parallel interleaved positive plates 46 and negative plates 48 mutually held in spaced relation by thin separators (not shown) therebetween. The positive plates 46 each include an upwardly extending grid lug 50 are electrically and mechanically joined by a cast lead strap 52. The method of joining the battery plates 46 by means of the cast-on-strap 52 and the advantages thereof are well known to those skilled in the art and are taught in U.S. Pat. No. 3,087,005 issued Apr. 23, 1963 to Sabatino et al. The cast lead straps 52 joining the positive plates 46 each include an upwardly projecting member 54 positioned ajacent to the aperture 31 of the single thickness partition wall portion 30 in facing relation to a complementary upwardly projecting member 55 of a cast lead strap 58 joining the upwardly extending lugs 60 of negative plates 48 in an adjacent cell compartment 14. The upwardly projecting members 54 and 55 are welded together through the aperture 31 to form an electrical and mechanical joint between the positive plates 46 of one cell and the negative plates 48 of an adjacent cell. A method and apparatus for forming the welded connection through the aperture 31 are well known to those skilled in the art and are described in U.S. Pat. No. 3,897,269 issued July 29, 1975 to Sabatino et al. The welded electrical connection through the partition wall portion 30 has the advantage of a formed fluid tight joint around the periphery of the aperture 31 and thereby prevents leakage of electrolyte between adjacent cells 14.

Though FIGS. 2 and 4 illustrate the cell compartments as being integrally joined by a vertical vane 26b functional to increase the rigidity of the container, the vane 26b could be deleted thereby facilitating air flow laterally through the battery between the adjacent cells.

Resume

When in use in a hybrid vehicle, a battery of the type shown in the drawings and described above, will generate heat. The battery is to be positioned to permit free air flow through the air passages in the container and through the slots in the battery cover, the air flow being caused by heat generated in the battery during charging and discharging. Additionally, cooling of the battery could be further improved by alternatively providing means for forcing air to flow through the air passages in the battery. Such air flow will cause each of the cells of the battery to be cooled substantially equally, and accordingly, the temperatures of the respective cells of the battery will be maintained uniform. If, on the other hand, an effective means were not provided to facilitate uniform cooling of the respective cells, those cells having higher temperatures would be caused to "gas" more and would lose electrolyte faster than the remaining cells. Furthermore, those cells having a higher temperature and subjected to the same voltage as cells at a lower temperature would not be charged at the same rate as the cooler adjacent cells. Additionally, heat buildup in the battery cells also causes thermal damage to the various components of the battery shorteining the effective life of the battery.

We claim:

1. A one-piece molded thin-walled polymer battery container comprising a plurality of unitary individual compartments therein integrally connected and for containing battery grids and electrolyte therein, and said container including opposed parallel spaced apart vertical end walls, vertical side walls joining said end walls, and pairs of mutually spaced apart partition walls extending between said side walls, transverse to said side walls and integrally joined with said side walls, each of said pairs of partition walls separating two adjacent compartments, and said pairs of partition walls each defining a narrow generally planar air-flow passage therebetween, and each of said partition walls having upper edges, and said partition walls forming each pair of partition walls being integrally joined adjacent a portion of their upper edges to form a single thickness partition wall portion, said air-flow passages including two spaced apart portions adjacent said upper edges and on opposite sides of said single partition wall portion.

2. The one-piece molded thin-walled polymer battery container set forth in claim 1 wherein said side walls each include an opening therein, said opening communication with one of said air flow passages and permitting air flow through said side walls.

3. The one-piece molded thin-walled polymer battery container set forth in claim 1 wherein said single wall portions each include an aperture therethrough.

4. The one-piece molded thin-walled polymer battery container set forth in claim 1 wherein said single thickness partition wall portion defines a plane parallel to the adjacent pair of partition walls and therebetween.

5. A battery comprising a one-piece molded thin walled polymer battery container having an open top and defining a series of parallel integrally joined compartments each of said compartments including side walls and a bottom wall and defining a cavity therein; stacked battery plates positioned in each of said compartments; and a top cover in sealed engagement with said open top for closing said compartments; said molded container including pairs of mutually spaced apart partition walls extending between said side walls, transverse to said side walls and integrally joined therewith, each of said pairs of partition walls separating two adjacent compartments, and each of said pairs of partition walls defining a narrow generally planar air-flow passage therebetween, and said partition walls having upper edges, and each pair of partition walls being integrally joined adjacent a portion of their upper edges and forming a single thickness partition wall, and said top cover including a plurality of openings therethrough, said openings being in communication with said air-flow passages and permitting air flow through said top cover.

6. The battery set forth in claim 5 wherein said openings comprise a plurality of pairs of parallel slots, the slots of each of said pairs of slots being linearly aligned.

7. The battery set forth in claim 5 wherein said partition wall portions of each of said pairs of partition walls includes an aperture therethrough, and wherein a connecting means for electrically connecting the battery plates of adjacent compartments extends through said aperture.

8. The battery set forth in claim 5 wherein said side walls each include an opening therein, said opening communicating with one of said air-flow passages and permitting air flow through said side walls.

* * * * *